United States Patent
Kuri

(10) Patent No.: US 9,374,164 B2
(45) Date of Patent: Jun. 21, 2016

(54) OPTICAL ACCESS SYSTEM

(75) Inventor: Toshiaki Kuri, Koganei (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 219 days.

(21) Appl. No.: 13/995,762

(22) PCT Filed: Dec. 12, 2011

(86) PCT No.: PCT/JP2011/079265
§ 371 (c)(1),
(2), (4) Date: Jun. 19, 2013

(87) PCT Pub. No.: WO2012/086559
PCT Pub. Date: Jun. 28, 2012

(65) Prior Publication Data
US 2013/0272701 A1    Oct. 17, 2013

(30) Foreign Application Priority Data

Dec. 20, 2010 (JP) ................................. 2010-283327

(51) Int. Cl.
*H04J 14/00*    (2006.01)
*H04B 10/27*    (2013.01)
(Continued)

(52) U.S. Cl.
CPC ............ *H04B 10/27* (2013.01); *H04J 14/0212* (2013.01); *H04J 14/0217* (2013.01); *H04J 14/0284* (2013.01); *H04L 12/2885* (2013.01)

(58) Field of Classification Search
CPC .............. H04J 14/0212; H04J 14/0217; H04J 14/0284; H04B 10/27; H04L 12/2885
USPC .......................................... 398/45–64, 66–73
See application file for complete search history.

(56) References Cited

U.S. PATENT DOCUMENTS 5,351,146 A    9/1994 Chan et al.
6,879,783 B1 *   4/2005 Nakahira ........................ 398/51
(Continued)

FOREIGN PATENT DOCUMENTS

JP        7-7523 A       1/1995
JP    2001-313660 A      11/2001
JP    2006-191212 A       7/2006

OTHER PUBLICATIONS

Xu et al., "Incorporating optical private network in network virtualization for emerging network services", 2010 9th International Conference on Optical Internet (COIN), Jul. 11, 2010, p. 1-3.

*Primary Examiner* — Ken N Vanderpuye
*Assistant Examiner* — Dibson Sanchez
(74) *Attorney, Agent, or Firm* — Sughrue Mion, PLLC

(57) ABSTRACT

An optical access system is provided that enables subscriber terminals or termination devices to be interconnected via dedicated lines as needed, with respect to subscriber terminals or termination devices participating in an optical network.

The optical network is a network connecting a plurality of accommodating stations, and in this network, the accommodating stations have a plurality of optical line termination devices and optical path selection means, the subscriber side optical terminals or optical line termination devices are connected in single star optical paths, and the optical line termination devices in the accommodating stations are connected with the above mentioned optical terminals or optical line termination devices via the optical path selection means. In this optical network, in the case of a subscriber side optical terminal or optical line termination device (A) connecting to an optical line termination device (B) in an accommodating station (X), a dedicated optical line is established via the optical path selection means in the accommodating station, and in the case of a subscriber side optical terminal or optical line termination device (A) connecting to an optical line termination device (C) in another accommodating station (Y), a dedicated optical line is established via the optical path selection means in the accommodating station (X), the optical network, and the optical path selection means in the other accommodating station (Y).

14 Claims, 6 Drawing Sheets

(51) Int. Cl.
*H04J 14/02* (2006.01)
*H04L 12/28* (2006.01)

(56) References Cited

U.S. PATENT DOCUMENTS

| | | | |
|---|---|---|---|
| 8,238,325 B2* | 8/2012 | Hayakawa et al. ........... 370/352 |
| 8,781,323 B2* | 7/2014 | Kwon ..................... H04L 12/00 |
| | | | 398/63 |
| 8,934,771 B2* | 1/2015 | Smolorz ............ H04Q 11/0067 |
| | | | 398/15 |
| 2005/0019031 A1* | 1/2005 | Ye ........................ H04B 10/077 |
| | | | 398/19 |
| 2007/0127917 A1* | 6/2007 | Fujii ................................. 398/5 |
| 2007/0133533 A1* | 6/2007 | Solomon ................. H04L 12/18 |
| | | | 370/390 |
| 2007/0230481 A1* | 10/2007 | Ikeda ................. H04L 12/2856 |
| | | | 370/395.53 |
| 2008/0013950 A1* | 1/2008 | Boudreault ......... H04J 14/0212 |
| | | | 398/59 |
| 2008/0069564 A1* | 3/2008 | Bernard ............. H04Q 11/0067 |
| | | | 398/72 |
| 2008/0131122 A1* | 6/2008 | Reisslein ............ H04J 14/0227 |
| | | | 398/59 |
| 2009/0074403 A1* | 3/2009 | Chi ....................... H04B 10/275 |
| | | | 398/3 |
| 2009/0252492 A1* | 10/2009 | Sone ................... H04L 12/2852 |
| | | | 398/49 |
| 2009/0290873 A1* | 11/2009 | Takita ................... H04J 3/1611 |
| | | | 398/59 |
| 2010/0046941 A1* | 2/2010 | Stadler ................... H04B 10/27 |
| | | | 398/25 |
| 2010/0232794 A1* | 9/2010 | Zheng ................... H04J 3/1694 |
| | | | 398/68 |

* cited by examiner

OPTICAL ACCESS SYSTEM

CROSS REFERENCE TO RELATED APPLICATIONS

This application is a National Stage of International Application No. PCT/JP2011/079265 filed Dec. 12, 2011 (claiming priority based on Japanese Patent Application No. 2010-283327 filed Dec. 20, 2010), the contents of which are incorporated herein by reference in their entirety.

TECHNICAL FIELD

The present invention relates to an optical access system that is an optical network but nevertheless enables temporary establishment of a dedicated line for communication between subscriber terminals or termination devices.

BACKGROUND ART

In conventional optical networks, the access network between an accommodating station and a subscriber terminal includes the following dedicated and shared types.
(1) Dedicated
  The accommodating station and the subscriber terminal are interconnected by a dedicated optical cable.
(2) Shared
  The accommodating station is connected to a branch point by an exclusive optical cable, and the branch point is connected to a plurality of subscriber terminals by respective optical cables. As shown below, active devices are used in some cases and passive devices are used in others.
  2a) AON (Active Optical Network)
  An active device is used at the branch point to differentiate the destination subscriber terminal based on the transmitted data.
  2b) PON (Passive Optical Network)
  At the branch point, a passive device called a splitter is used to simply separate the transmitted light. The following are some specific examples.
    2b1) A-PON
    Uses ATM (Asynchronous Transfer Mode) as the protocol.
    2b2) B-PON
    Uses Wavelength Division Multiplexing (WDM)
    2b3) E-PON
    Uses Ethernet (registered trademark) as the protocol.

Although among the above examples the dedicated access network is most desirable for the subscriber in terms of optimum degree of freedom and security, shared access networks are also widely used because the optical fiber facilities can be installed on a smaller scale in comparison. Further, among the shared access networks, the PON system is more frequently used because the distributed installation of the active devices in the AON system increases maintenance and management work.

In the PON (Passive Optical Network) system, the optical transmission paths are physically shared at some locations between the accommodating station and a plurality of the subscriber terminals. Access control is therefore indispensable at the shared locations, so that use of the optical transmission path is more restricted than in a dedicated system, owing to the need for, inter alia, standardization for the rules to share optical transmission path. Another disadvantage is that the splitter branching characteristics cause greater splitting loss with increasing number of branches. In addition, the splitter does nothing more than split, which means that downlink optical signals are broadcasted to all subscribers under the same splitter. This leaves room for security improvement from the viewpoint of the desirable physical separation of distributed signals. An additional problem is the difficulty of logical isolation in distribution to subscribers under the splitter and of monitoring the lines to the individual subscribers. Further, as regards resources of an access system, specifically a communication capacity at bottlenecks, a rigid passive system makes it difficult to respond flexibly to demand and supply with an eye to future increases in the number of subscribers.

The optical access system of the present invention performs optical path switching in the optical network, while Document 1 describes an optical node and optical branch insertion apparatus that can switch light pass of the optical network and can switch connection between a plurality of networks with an optical signal maintained as it is. For this, an intersection point of ring networks A, B each comprising at least two optical transmission paths is equipped with an optical node for optically interconnecting the plurality of ring networks A, B, which optical node comprises an optical cross-connect switch unit for switching and optically connecting a plurality of lines between the plurality of ring networks A, B and control means for controlling the switching of the optical cross-connect switch unit.

Moreover, the optical access system of the present invention is also a wavelength division multiplexing network, while a wavelength division multiplexing network is disclosed, for example, in Document 2. This is a wavelength division multiplexing network capable of performing high-capacity optical access service with a simple configuration. It has the following features. Specifically, in an optical network having a multi-echelon network, the highest-level network is a ring network having a center node and a remote node, the intermediate-level network has a ring configuration whose center node is a node belonging to the higher-order network, and the lowest-level network is centered on an accommodating station that aggregates traffic from a plurality of ONUs (optical network units) and is a star network directly connecting the accommodating station and each ONU by optical fibers, the center node belonging to the highest-level network and the ONUs use their respective lights with different wavelength to establish direct communication paths, and, at a node interposed between the two, amplification and branching, or routing are performed on the optical signal as it is without electrical processing.

Patent Document 1: Unexamined Japanese Patent Publication 2006-191212
Patent Document 2: Unexamined Japanese Patent Publication 2001-313660

DISCLOSURE OF THE INVENTION

Subject to be Solved by the Invention

As regards interconnection among subscriber terminals embraced by an optical network, no conventional optical network has been capable of, as required, interconnecting subscriber terminals or termination devices to one another by dedicated lines in the optical domain.

The present invention is provided for realizing an optical access system, in response to requests from subscriber terminals or termination devices, monopolizes optical paths for connecting the subscriber terminals or the termination devices to one another by dedicated lines.

Means for Solving the Problems

The optical access system of this invention is an optical access system constituted as an optical network in which a plurality of accommodating stations are connected by optical paths to form a network, the accommodating stations comprise a plurality of optical line termination devices and optical path selection means, subscriber side optical terminals or optical line termination devices are collectively connected to the accommodating stations, the accommodating stations and the subscriber side optical terminals or the optical line termination devices are connected by optical paths, the optical line termination devices in the accommodating stations and the subscriber side optical terminals or optical line termination devices are connected via the optical path selection means, and the network is controlled by a control device, wherein when a subscriber side optical terminal or optical line termination device (A) connects to an optical line termination device (B) in the accommodating station connected to the subscriber side optical terminal or optical line termination device (A), a dedicated optical path is established to connect via the optical path selection means in the accommodating station; when the subscriber side optical terminal or optical line termination device (A) connects to an optical line termination device (C) in an accommodating station (Y) connected by the network to an accommodating station (X) connected to the subscriber side optical terminal or optical line termination device (A), a dedicated optical path is established to connect via the optical path selection means in the accommodating station (X), the network and the optical path selection means in the accommodating station (Y); and when a plurality of the dedicated optical paths are present, they are separated to be mutually independent.

Further when a subscriber side optical terminal or optical line termination device (D) connected to an accommodating station to which the subscriber side optical terminal or optical line termination device (A) is connected connects to the subscriber side optical terminal or optical line termination device (A), a dedicated optical path is established to connect via the optical path selection means in the accommodating station; and when a subscriber side optical terminal or optical line termination device (E) connected to the accommodating station (Y) connected by the network to the accommodating station (X) to which the subscriber side optical terminal or optical line termination device (A) is connected connects to the subscriber side optical terminal or optical line termination device (A), a dedicated optical path is established to connect via the optical path selection means in the accommodating station (X), the network and the optical path selection means in the accommodating station (Y).

The optical path selection means is an optical switching unit consisting of optical switching elements for switching optical paths, an optical path branching unit for separating optical paths, or an optical beam splitter.

The accommodating station is one to which a plurality of the subscriber side optical terminals or optical line termination devices are connected and connection of optical path thereof is a single star topology.

At least one of the accommodating stations is connected not only to the network but also by one or more optical path to a core network interconnecting with the other networks.

The network topology is mesh type, multi-ring type, or one in which a pair of accommodating stations in the mesh type is interconnected by a plurality of optical paths. However, "mesh type" as termed here is, as a special case, defined to include single ring type, star type, and tree type and so forth.

The optical path is one in which individually separable channels are multiplexed; and the optical path selection means is a dynamic optical channel allocation device that receives a plurality of optical signals as input, divides them into division-multiplexing-capable optical channel components, switches or replicates the optical channel components, and thereafter dynamically allocates to output destinations a plurality of new optical signals obtained by re-multiplexing.

The channel multiplexing is one multiplexing among any of wavelength division multiplexing, frequency division multiplexing, time division multiplexing, polarization division multiplexing, propagation path division multiplexing, code division multiplexing, and division multiplexing enabling demultiplexing by secondary modulation using a system of orthogonal functions; or a combination of any of the division multiplexings.

The optical path is one using an optical fiber transmission path.

The optical path is one using an optical fiber transmission path or an optical spatial transmission path.

In the channel multiplexing, at least one logical network is formed with respect to at least one of the individual separable channels.

In the wavelength division multiplexing at least one logical network is formed with respect to at least one of the individual wavelengths.

The logical network can logically independently separate the optical line termination device in the accommodating station, the optical path selection means in the accommodating station, and the subscriber side optical terminal or optical line termination device; and is formed by combining a portion obtained by logically separating the optical line termination device in the accommodating station, a portion obtained by logically separating one part of the optical path selection means in the accommodating station, and a portion obtained by logically separating one part of the subscriber side optical terminal or optical line termination device.

Effect of the Invention

As regards interconnection between subscriber terminals or termination devices embraced by an optical network, or connection of a subscriber terminal and an accommodating station, connection via a dedicated path is enabled as required, thereby increasing the communication security of the interconnection and making use of subscriber-specific communication modes possible, and thus enhancing degree of freedom of communication. Moreover, a virtual network comes to be easily configured and network administration is facilitated.

Figure 1:
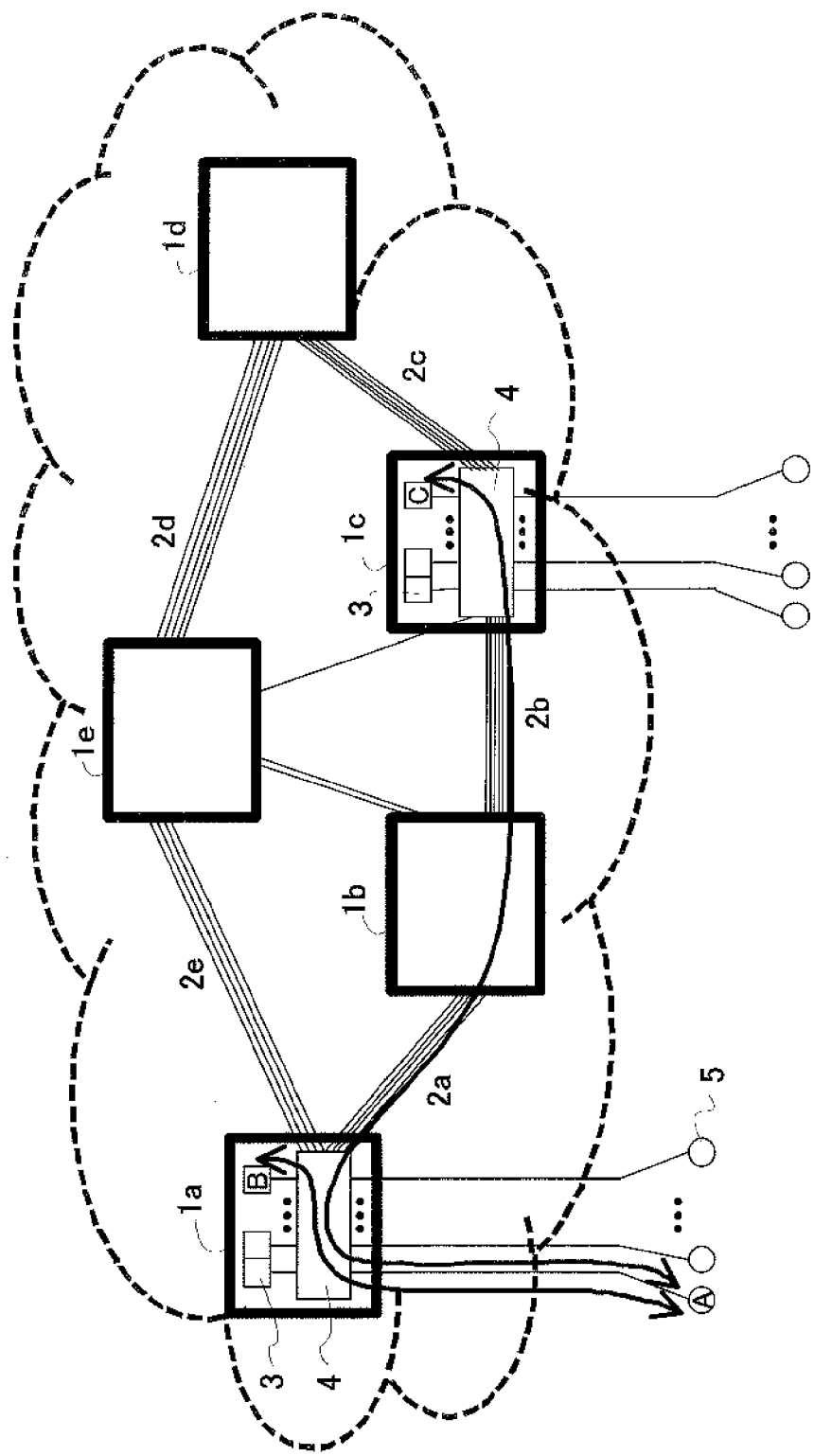
FIG. 1 is a diagram showing an optical network as an example of the optical access system of the present invention. This example is one in which accommodating stations 1a, 1b, 1c, 1d, 1e are connected by a plurality of optical cables 2a, 2b, 2c, 2d, 2e. Subscriber optical terminals or optical line termination devices 5 are connected to each accommodating station, and subscribers use them either to photoelectrically convert output optical signals from the subscriber optical terminals 5 to electrical signals using the optical line termination devices or to input the optical signals to optical terminals equipped with optical input ports.

EXPLANATION OF THE REFERENCE NUMERALS 1a, 1b, 1c, 1d, 1e Accommodating station
2a, 2b, 2c, 2d, 2e Optical cable
3 Optical line termination device
4, 4a, 4c Optical switch
5 Subscriber optical terminal
30 Accommodating station
31 Optical switch
32 OLT (Optical Line Terminal)
33 Access network virtualization function control unit
34 Network gateway function control unit
35 Core network virtualization function control unit
36 Transponder
37 Optical switch
38 Optical path
40 Optical switch
41 Optical amplifier
42 Demultiplexer
43 Multifunction switch
44 Multiplexer
45 Optical amplifier

BEST MODE FOR CARRYING OUT THE INVENTION

In the following, a mode of carrying out this invention is described in detail based on the drawings. In the absence of any special reason, identical symbols are used in the following for devices having the same function or similar function.
1st Embodiment As an example of an optical access system of the present invention, FIG. 1 shows an example of an optical network. In this, accommodating stations 1a, 1b, 1c, 1d, 1e are connected by optical cables 2a, 2b, 2c, 2d, 2e comprising many optical fibers. Subscriber optical terminals 5 are connected to the individual accommodating stations, and subscribers use the subscriber optical terminals 5 for converting output beams from the subscriber optical terminals 5 to electrical signals with optical line termination devices to connect to wired LANs (Local Area Networks) or wireless LANs, or inputting the output optical signals to optical terminals equipped with optical input ports. Some of the optical fibers here can be replaced with optical spatial transmission paths.

In FIG. 1, a subscriber side optical terminal or optical line termination device (A) is connected to an optical line termination device (B) of the accommodating station la. Here, the subscriber side optical terminal or optical line termination device (A) is connected to the accommodating station 1a. An optical path selection means of the accommodating station 1a uses an optical switch 4, and, for example, uses the switch 4 to connect the subscriber side optical terminal or optical line termination device (A) to the optical line termination device (B) of the accommodating station la via a dedicated optical path. By the dedicated optical path referred to here, is meant that it is not connected to any optical line termination device other than the subscriber side optical terminals or optical line termination devices (A) and (B).

Moreover, in FIG. 1, the subscriber side optical terminal or optical line termination device (A) is connected to the accommodating station 1a. Further, the accommodating station 1a is connected via the accommodating station 1b to the accommodating station 1c. As the accommodating station 1c is equipped with an optical line termination device (C), the result is that the subscriber side optical terminal or optical line termination device (A) is connected to the optical line termination device (C). In such a connection from the subscriber side optical terminal or optical line termination device (A) to the optical line termination device (C), a dedicated optical path is established via the optical path selection means of the accommodating station 1a, the optical network, and an optical path selection means of the accommodating station 1c.
2nd Embodiment Also in FIG. 2, the subscriber side optical terminal or optical line termination device (A) is connected to the optical line termination device (B) of the accommodating station 1a, and to the optical line termination device (B) of the accommodating station 1a. Further, similarly to FIG. 1, the optical path selection means of the accommodating station 1a uses the optical switch 4 and, for example, first uses the switch 4 to connect the subscriber side optical terminal or optical line termination device (A) to the optical line termination device (B) of the accommodating station 1a by a dedicated optical path. Further, regarding another subscriber side optical terminal or optical line termination device (D) connected to the accommodating station 1a, when the subscriber side optical terminal or optical line termination device (D) connects to the subscriber side optical terminal or optical line termination device (A), a dedicated optical path is established to connect via the switch 4 of the accommodating station.

Figure 2:
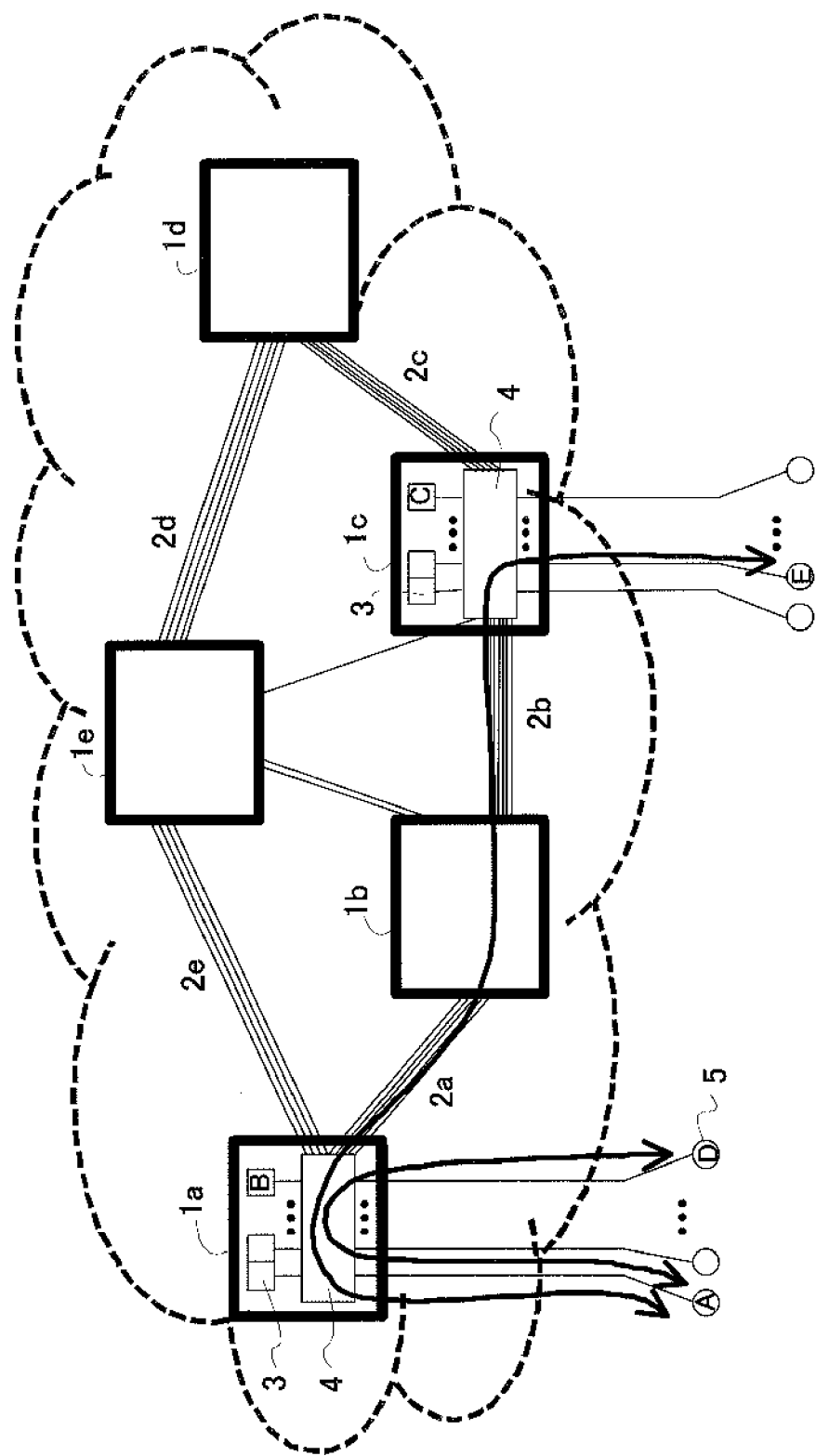
FIG. 2 is a diagram showing a second embodiment, in which, regarding another subscriber side optical terminal or optical line termination device (D) connected to an accommodating station 1a, when the subscriber side optical terminal or optical line termination device (D) connects to a subscriber side optical terminal or optical line termination device (A), a dedicated optical path is established to connect via an switch 4 of the accommodating station 1a. Further, regarding a subscriber side optical terminal or optical line termination device (E) connected to an accommodating station 1c, when the subscriber side optical terminal or optical line termination device (E) connects to the subscriber side optical terminal or optical line termination device (A), a dedicated optical path is established to connect via an switch 4a of the accommodating station 1a, the network and an switch 4c of the accommodating station 1c.

Moreover, in FIG. 2, the accommodating station 1a is connected to the accommodating station 1c by the network. In this case, regarding a subscriber side optical terminal or optical line termination device (E) connected to the accommodating station 1c, when the subscriber side optical terminal or optical line termination device (E) connects to the subscriber side optical terminal or optical line termination device (A), a dedicated optical path is established to connect via an switch 4a of the accommodating station 1a, the network, and an switch 4c of the accommodating station 1c.

3rd Embodiment

Figure 3:
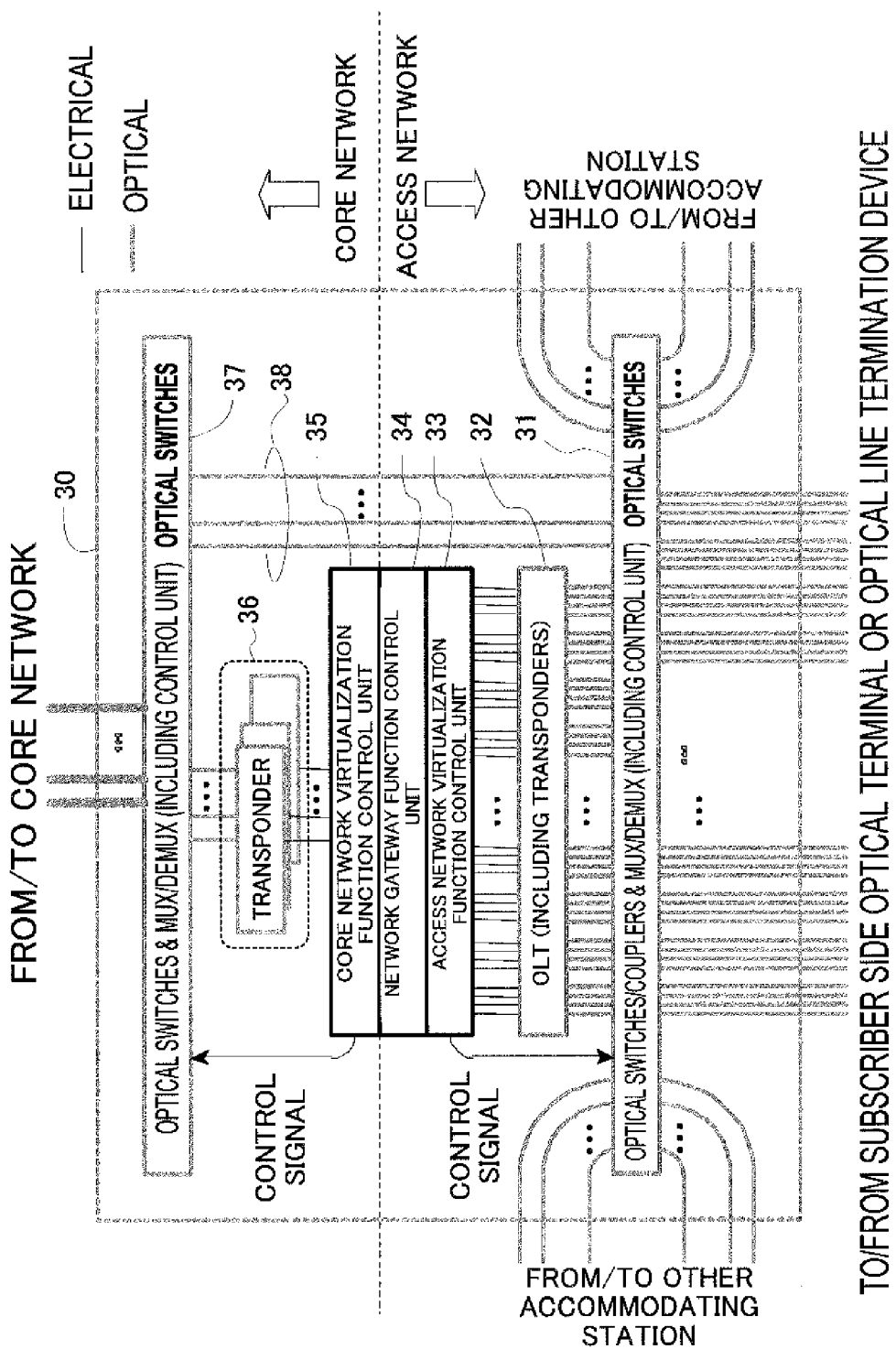
FIG. 3 is a diagram showing a configuration example of an accommodating station. The subscriber side optical terminals or optical line termination devices are connected to optical paths on the lower side of an optical switch 31. The optical switch 31 utilizes optical switches, optical couplers, multiplexers and demultiplexers. A part of the output optical signals from the optical switch 31 is photoelectrically converted to an electrical signal by an OLT (Optical Line Terminal) and signal-processed by an Access network virtualization function control unit 33 for forming a logical network, and the control signal resulting from the signal processing is applied to the optical switch 31. Further, the access network is configured by connecting the optical switch 31 to the optical switches of other accommodating stations.

A configuration example of a switch is shown in FIG. 3. In order to develop an optical access system of the configuration of FIG. 1 or FIG. 2, the access network portion under the horizontal broken line of FIG. 3 is used. With the configuration in this case, the subscriber side optical terminals or optical line termination devices are connected to the optical paths below an optical switch 31. The optical switch 31 utilizes optical switches, optical couplers, multiplexers and demultiplexers. A part of the output from the optical switch 31 is photoelectrically converted to an electrical signal by an OLT (Optical Line Terminal) and signal-processed by an Access network virtualization function control unit 33, and the control signal resulting from the signal processing is applied to the optical switch 31. The Access network virtualization function control unit 33 is for realizing a logical network. This is at least one logical network formed with respect to at least one individually separable channel. Further, this access network is configured by connecting the optical switch 31 to the optical switches of other accommodating stations.

Figure 4:
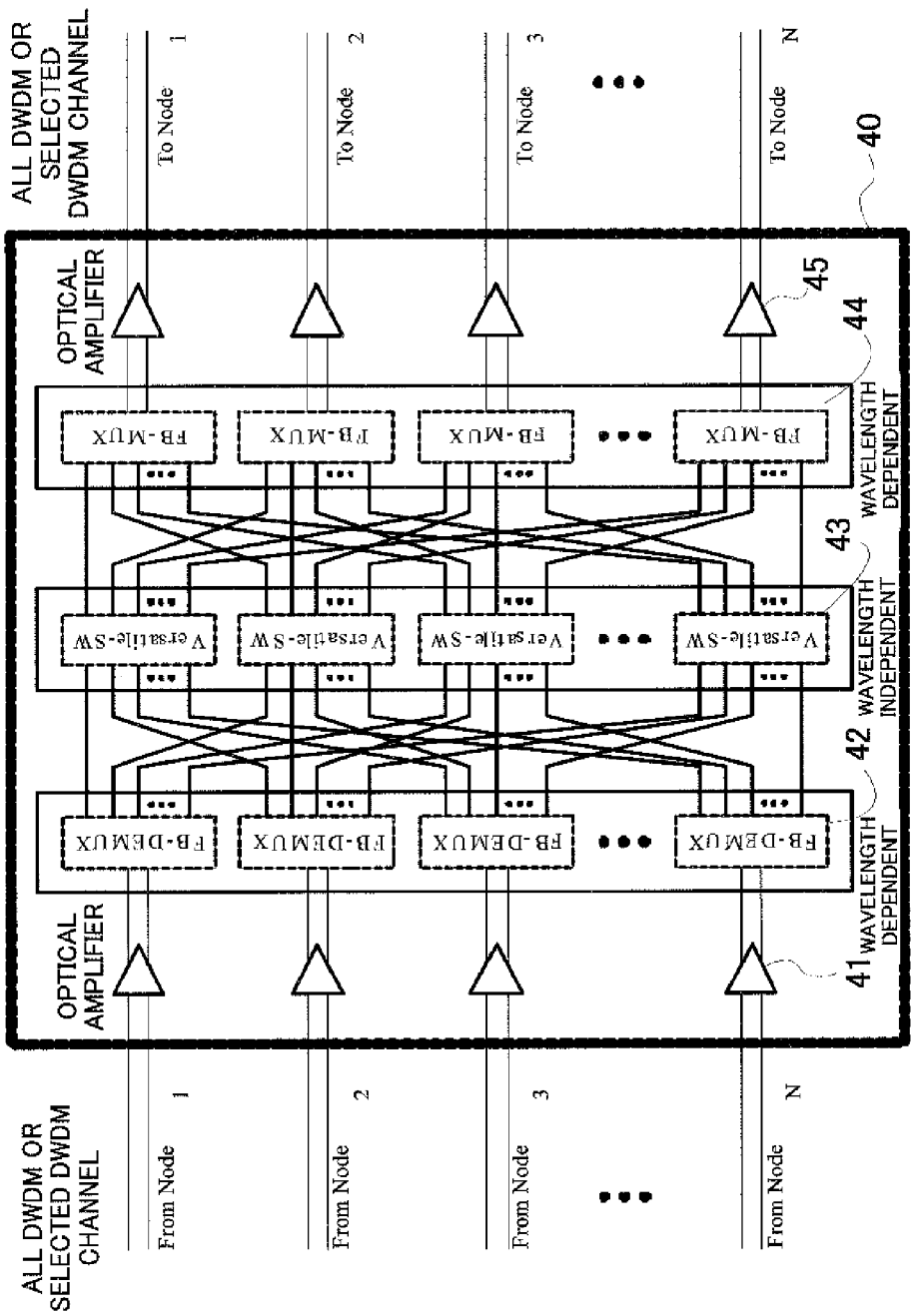
FIG. 4 is a diagram showing an example of an optical switch in an accommodating station. This switch inputs and outputs wavelength-multiplexed optical signals. Optical signals input from the left side are amplified, sorted among optical paths by wavelength using demultiplexers (DE-MUXs), subjected to time switching and spatial switching of optical path with multifunction switches (Versatile Switches), wavelength multiplexed once again using multiplexers (MUXs), amplified, and output.

An example of an optical switch in the accommodating station of FIG. 3 is shown in FIG. 4. This optical switch 40 inputs and outputs wavelength-multiplexed optical signals. Therefore, optical signals input from the left side are amplified by optical amplifiers 41, sorted among optical paths by wavelength using demultiplexers (DEMUXs) 42, subjected to optical-path temporal switch and spatial switch using multifunction switches (Versatile Switches) 43, wavelength multiplexed once again using multiplexers (MUXs) 44, amplified by an optical amplifiers 45, and output.

Thus, in the wavelength division multiplexing, at least one logical network can be formed with respect to at least one of the individual wavelengths.

Figure 5:
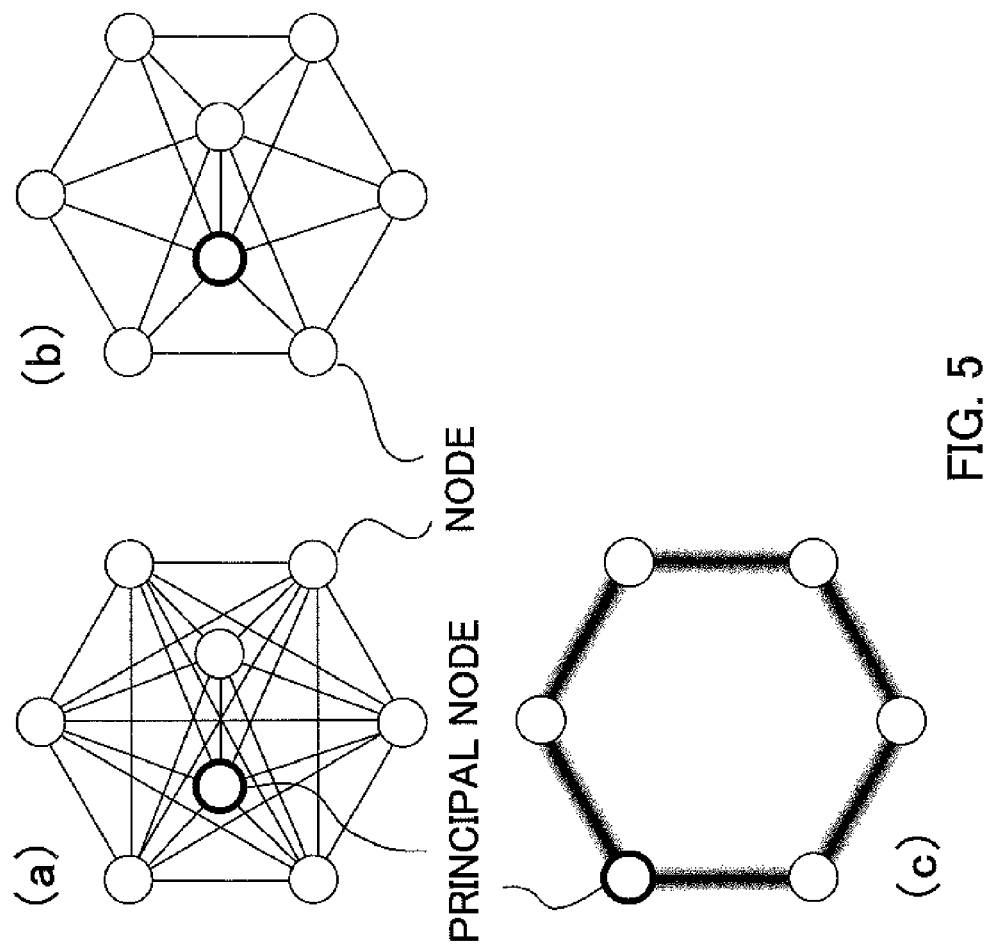
FIG. 5 is a diagram showing an example configuration of the access network. (a) is full-mesh type, in which two arbitrary accommodating stations are interconnected. Principal nodes are provided with control units of the access network. (b) is partial mesh type, in which an arbitrary accommodating station is connected to four or more accommodating stations. In (c), accommodating stations are arranged in a ring configuration and adjacent accommodating stations are connected by a plurality of optical paths.

An example configuration of the access network is shown in FIG. 5. FIG. 5(a) is full-mesh type, in which two arbitrary accommodating stations are interconnected. Principal nodes are provided with control units of the access network. FIG. 5(b) is partial mesh type, in which an arbitrary accommodating station is connected to four or more accommodating stations. Further, in FIG. 5(c), accommodating stations are arranged in a ring configuration and adjacent accommodating stations are connected by a plurality of optical paths. In the present invention, insofar as a part of the access network has the connection mode of FIG. 5(a) to (c), even if the present invention is applied to that part, no problem of other connections being totally excluded is caused by its application provided that the dedicated optical path is single channel.

Obviously, the required number of optical paths between accommodating stations usually differs with the use conditions of the dedicated optical paths to be implemented. However, the number can be concretely determined in advance for the conditions desired to be implemented, and in the case of the respective dedicated optical paths to be implemented, for example, when an optical path serving as a dedicated optical path is deleted it is no problem in that the network will not be divided. In other words, when, for example, a tree network is assumed at the start and connections corresponding to dedicated optical paths to be implemented, then when a deficiency or division from the desired number of optical paths occurs in the connections, the deficiency or division is compensated by newly providing optical paths for connecting the deficient or divided portions. If this process is performed with respect to the case of every dedicated optical path to be implemented, the desired access network can be realized.

Moreover, the optical path can be one obtained by multiplexing individually separable channels. In this case, the optical path selection means is a dynamic optical channel allocation unit which receives a plurality of optical signals as input, divides them into division-multiplexing-capable optical channel components, switches or replicates the optical channel components, and thereafter dynamically allocates to output destinations a plurality of new optical signals obtained by re-multiplexing. To be specific, the channel multiplexing is one or a combination of multiplexing among any of wavelength division multiplexing, frequency division multiplexing, time division multiplexing, polarization division multiplexing, propagation path division multiplexing, code division multiplexing, and division multiplexing enabling demultiplexing by secondary modulation using a system of orthogonal functions.

Further, the logical network can logically independently separate the optical line termination device of the accommodating station, the optical path selection means of the accommodating station, and the subscriber side optical terminal or optical line termination device. In other words, the logical network is formed by combining a portion obtained by logically separating the optical line termination device of the accommodating station, a portion obtained by logically separating one part of the optical path selection means of the accommodating station, and a portion obtained by logically separating one part of the subscriber side optical terminal or optical line termination device.

4th Embodiment

Figure 6:
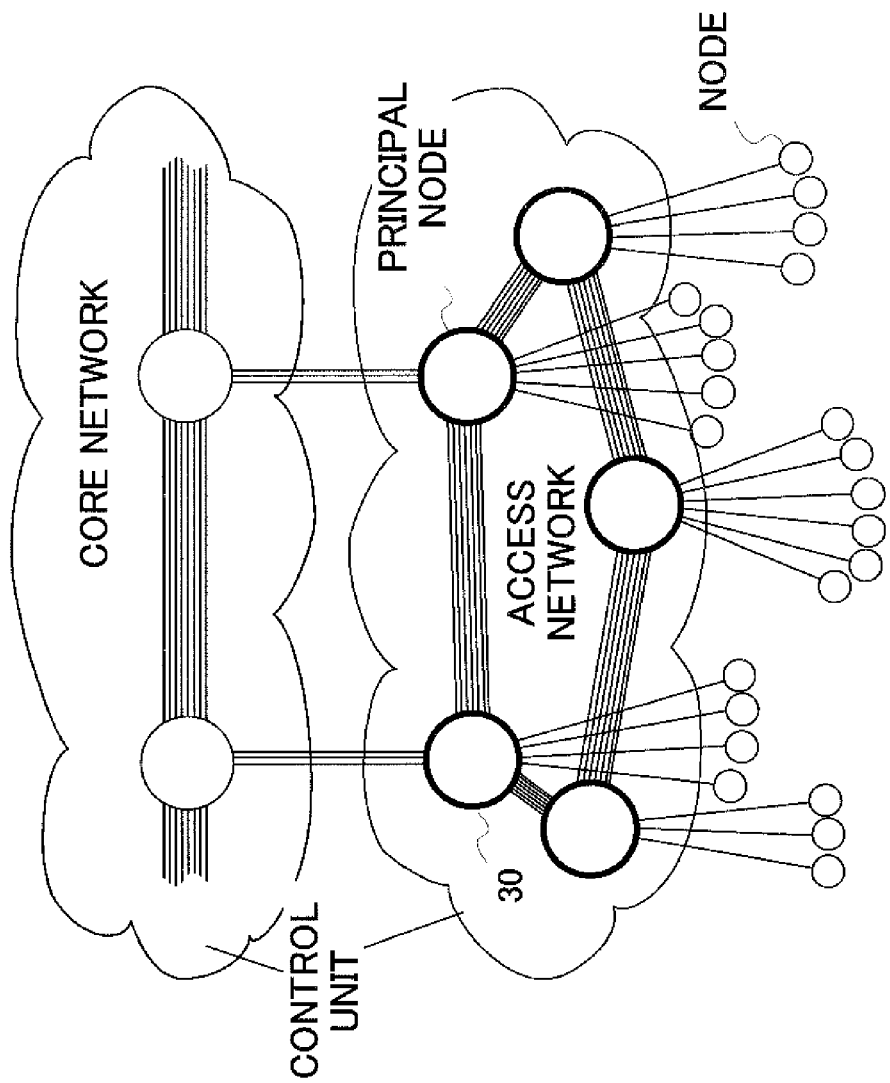
FIG. 6 is a diagram showing an example of connecting the access network of FIG. 1 to a core network. The accommodating stations in this case are connected to the core network using the core network portion above the horizontal broken line in FIG. 3.

FIG. 6 shows an example of connecting the access network shown in FIG. 1 to a core network. The accommodating stations in this case are connected to the core network using the core network portion above the horizontal broken line in FIG. 3. At this time, protocol conversion is performed by a network gateway function control unit 34 functioning as a gateway, control for forming a logical network with respect to the core network is performed next by a core network virtualization function control unit 35, and, via a transponder 36, a predetermined optical path is selected by an optical switch 37 to connect to the core network. Or, otherwise, the core network and the access network are connected via an optical path 38 directly connecting the optical switch 31 and the optical switch 37.

By such a configuration, in the case of connecting from an optical terminal or optical line termination device directly connected to a certain accommodating station to the core network using a dedicated optical path, even when all connections from the accommodating station to the core network are busy, it is still possible, for example, to establish a dedicated optical path to the access network in a neighboring accommodating station and from there connect via an optical path linking the optical switch of the access network and the optical switch of the core network.

The following practical effects can be expected by application of the present invention.

(1) The ability to monopolize fiber resources between an accommodating station and a subscriber makes it possible to freely provide and enjoy various services, including newly created services and customized services, without being affected by pre-existing standards, other users and the like.

(2) Loose coupling of passive infrastructure and active infrastructure promotes services-based competition based on facilities-based competition driven by technological innovation, while resource linkage between accommodating stations and multi-tenant architecture enable economical provision and enjoyment of broad-ranging services.

(3) As overlay techniques enable logical compatibility with existing architecture, it becomes possible to inherit technical advantages and achieve smooth migration.

(4) Stable and prompt provision and enjoyment of services matched to demand trends are realized thanks to stabilization of the operating and maintenance environment by deployment of adaptive facilities in the accommodation building and efficiency enhancement achieved by resource interlinking and management consolidation.

(5) Services can be provided and enjoyed more securely as a result of improved security owing to easier optical line monitoring and use of unicasting.

(6) Environmental burden can be lowered through electric-power conservation made possible by enabling optical branching loss reduction, sleep capability at the individual fiber level or individual wavelength/polarization level, and the like.

INDUSTRIAL APPLICABILITY

By converging the access networks shown in FIG. 6, this access network can be viewed as a huge single star configuration. From this, it can be seen that a huge single star interconnection can be configured by utilizing the present invention. Moreover, as regards internal optical wiring, a great number of unnecessary lines can be eliminated, thereby it is possible to realize a huge single star interconnection that saves on internal wiring.

The invention claimed is:

1. An optical access system constituted as an optical network comprising:
   a plurality of accommodating stations connected by optical paths to form an access network, one or more of the plurality of accommodating stations in the access network being connected to a core network, wherein the one or more of the plurality of accommodating stations comprises:
   one or more optical line termination devices; and
   an optical path selection means configured to connect one or more accommodating stations with one or more subscriber side optical terminals, wherein the optical path selection means of a first accommodating station among the plurality of accommodating stations is configured to establish a first dedicated optical path between the first accommodating station and a first subscriber side optical terminal among the one or more subscriber side optical terminals or a first optical line termination device, when the first subscriber side optical terminal or the first optical line termination device is to be connected to a second optical line termination device, the second optical line termination device being one of the one or more optical line termination devices in the first accommodating station,
   wherein the optical path selection means of the first accommodating station is configured to establish a second dedicated optical path between the first subscriber side optical terminal or the first optical line termination device and a third optical line termination device, the third optical line termination device being one of the one or more optical line termination devices in a second accommodating station among the plurality of accommodating stations, when the first subscriber side optical terminal or the first optical line termination device is to be connected to the third optical line termination device in the second accommodating station, the second dedicated optical path being mutually independent from the first dedicated optical path, and
   wherein the optical path selection means in at least one of the accommodating stations is configured to connect to an optical path selection means of the core network via (1) one or more optical path channels and (2) a logical network which is formed from at least one individually separable channel configured by an optical line termination device, an access network virtualization function control unit, a network gateway function control unit, a core network virtualization function control unit, and one or more transponders, included in the first or the second accommodating station.

2. The optical access system set out in claim 1,
   wherein the optical path selection means of the first accommodating station is configured to establish a third dedicated optical path between the first optical line termination device or the first subscriber side optical terminal and a second subscriber side optical terminal or a fourth optical line termination device, when the first subscriber side optical terminal or the first optical line termination device is to be connected to the second subscriber side optical terminal or the fourth optical line termination device, the second subscriber side optical terminal or the fourth optical line termination device being connected to the first accommodating station; and
   and
   wherein the optical path selection means of the first accommodating station is configured to establish a fourth dedicated optical path between the first subscriber side optical terminal or the first optical line termination device and a third subscriber side optical terminal or a fifth optical line termination device, when the first subscriber side optical terminal or the first optical line termination device is to be connected to the third subscriber side optical terminal or the fifth optical line termination device, the third subscriber side optical terminal or the fifth optical line termination device being connected to the second accommodating station.

3. The optical access system set out in claim 2, wherein the optical path selection means is an optical switching unit comprising at least one of optical switching elements for switching optical paths, an optical path branching unit for separating optical paths, and an optical beam splitter.

4. The optical access system set out in claim 1, wherein the optical path selection means is an optical switching unit comprising at least one of optical switching elements for switching optical paths, an optical path branching unit for separating optical paths, or an optical beam splitter.

5. The optical access system set out in claim 1, wherein the first accommodating station is connected to one or more of the subscriber side optical terminals or one or more of the optical line termination devices via optical paths in a single star topology.

6. The optical access system set out in claim 1, wherein at least one of the accommodating stations is connected not only to the access network but also to the core network solely by one or more optical paths.

7. The optical access system set out in claim 1, wherein the network topology is one of mesh type, multi-ring type, and one in which a pair of accommodating stations in the mesh type is interconnected by a plurality of optical paths.

8. The optical access system set out in claim 1, wherein the optical path comprises individually separable channels that are multiplexed; and the optical path selection means is a dynamic optical channel allocation device that receives a plurality of optical signals as input, divides them into division-multiplexing-capable optical channel components, switches or replicates the optical channel components, and thereafter dynamically allocates to output destinations a plurality of new optical signals obtained by re-multiplexing.

9. The optical access system set out in claim 8, wherein the channel multiplexing is:

one multiplexing among any of wavelength division multiplexing, frequency division multiplexing, time division multiplexing, polarization division multiplexing, propagation path division multiplexing, code division multiplexing, and division multiplexing enabling demultiplexing by secondary modulation using a system of orthogonal functions; or a combination of any of the wavelength division multiplexing, the frequency division multiplexing, the time division multiplexing, the polarization division multiplexing, the propagation path division multiplexing, the code division multiplexing, and the division multiplexing enabling demultiplexing by secondary modulation using a system of orthogonal functions.

10. The optical access system set out in claim 9, wherein in the wavelength division multiplexing at least one logical network is formed with respect to at least one of the individual wavelengths.

11. The optical access system set out in claim 8, wherein in the channel multiplexing, at least one logical network is formed with respect to at least one of the individual separable channels.

12. The optical access system set out in claim 11, wherein the logical network is formed by combining a separated channel portion obtained by logically separating the second optical line termination device in the first accommodating station, a separated channel portion obtained by logically separating one part of the optical path selection means in the first accommodating station, and a separated channel portion obtained by logically separating one part of the first subscriber side optical terminal or the first optical line termination device, wherein at least one of the logical network logically independently separates the second optical line termination device in the first accommodating station, the optical path selection means in the first accommodating station, and the first subscriber side optical terminal or the first optical line termination device.

13. The optical access system set out in claim 1, wherein the optical path comprises an optical fiber transmission path.

14. The optical access system set out in claim 1, wherein the optical path comprises an optical fiber transmission path or an optical spatial transmission path.

\* \* \* \* \*